United States Patent
Kobayashi et al.

(10) Patent No.: US 7,139,428 B2
(45) Date of Patent: Nov. 21, 2006

(54) IMAGE ENCODER, IMAGE ENCODING METHOD, RECORDING MEDIUM AND COMPUTER DATA SIGNAL EMBODIED IN A CARRIER WAVE

(75) Inventors: Hideki Kobayashi, Tokyo (JP); Kouichirou Hirao, Tokyo (JP)

(73) Assignee: NEC Corporation, Tokyo (JP)

(*) Notice: Subject to any disclaimer, the term of this patent is extended or adjusted under 35 U.S.C. 154(b) by 750 days.

(21) Appl. No.: 10/190,505

(22) Filed: Jul. 9, 2002

(65) Prior Publication Data
US 2003/0016875 A1 Jan. 23, 2003

(30) Foreign Application Priority Data
Jul. 10, 2001 (JP) .............................. 2001-209017

(51) Int. Cl.
G06K 9/34 (2006.01)
G06K 9/46 (2006.01)
H04N 1/60 (2006.01)
H04N 1/41 (2006.01)

(52) U.S. Cl. ...................... 382/180; 382/237; 382/240; 358/2.1; 358/426.02

(58) Field of Classification Search ................ 382/239, 382/180, 237, 240, 251; 358/2.1, 426.02
See application file for complete search history.

(56) References Cited

U.S. PATENT DOCUMENTS
5,999,664 A * 12/1999 Mahoney et al. ........... 382/305

FOREIGN PATENT DOCUMENTS
JP   H09-205647 A   8/1997
JP   2002-152516 A   5/2002

* cited by examiner

Primary Examiner—Duy M. Dang
(74) Attorney, Agent, or Firm—Sughrue Mion, PLLC

(57) ABSTRACT

A processor performs layout analysis, and classifies pieces of bitmap data into a character area and a picture area. The processor divides each of the character area and the picture area into a plurality of tiles having a predetermined shape, thereby creating a table including information representing either character attribute or picture attribute in association with each tile number. The processor performs scalar quantization for data of each tile using a quantization coefficient for characters or pictures, based on the created table. The processor encodes the data of each tile using an SNR progressive technique or a resolution progressive technique, and performs post quantization for the data using a quantization parameter for characters or pictures. Then, the processor stores the encoded data into a storage device.

12 Claims, 8 Drawing Sheets

F I G. 6
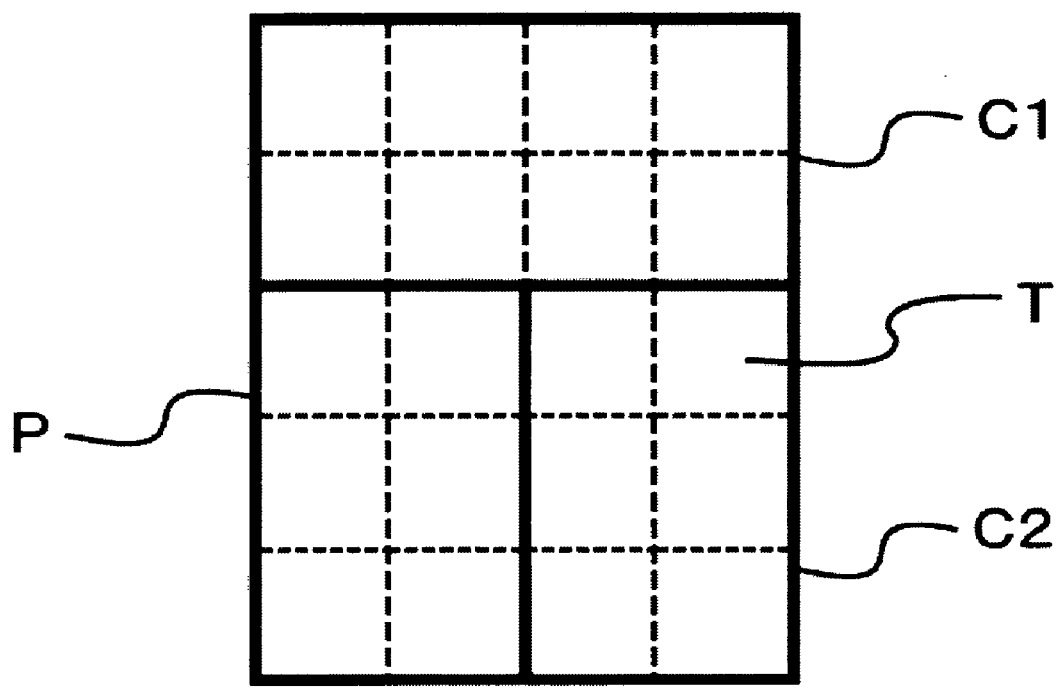

IMAGE ENCODER, IMAGE ENCODING METHOD, RECORDING MEDIUM AND COMPUTER DATA SIGNAL EMBODIED IN A CARRIER WAVE

BACKGROUND OF THE INVENTION

1. Field of the Invention

The present invention relates to an image encoder, an image encoding method, a recording medium and a computer data signal embodied in a carrier wave, for encoding electronic documents in consideration of the human recognition characteristics, thereby processing the electronic documents to be easily recognized by users and to be rapidly displayed.

2. Description of the Related Art

Recently, for the sake of conservation of natural resources or for the sake of cost reduction in office, paperless processing using IT (Information Technology) is becoming popular in companies, etc. As one paperless method, there is a technique for transforming paper documents into electronic documents. An image encoder (information encoder) reads out and digitizes information of characters or figures printed on a paper document by using a scanner, and stores the read and digitized information in an internal hard disk, etc. A user specifies an electronic document stored in the image encoder and displays the specified document on a display, so that the user can view the same information as that printed on the paper document.

The image encoder generally includes a search function for searching for a predetermined electronic document from a mass of electronic documents stored therein. To effectively use the search function, a keyword for search is attached to the electronic document. Upon reception of a search instruction together with the keyword input through the keyboard, etc., the image encoder begins searching a target electronic document.

To enhance the storage performance or transmission performance of the electronic documents, the image encoder reduces the amount of data to be encoded when transforming the paper documents into electronic documents.

The image encoder may transmit and display an electronic document using a progressive technique. According to a progressive technique, a low-quality image, whose resolution, gradation and frequency bandwidth are not initially in a sufficient level, is transmitted and displayed. Subsequently, additional information is transmitted piece by piece to gradually improve the quality of the image, and then the image with the best quality can be transmitted and displayed.

If an electronic document is transmitted using a progressive technique, a terminal which is connected to the image encoder displays a poor-quality image, and displays the image which will gradually be improved in its quality. In the end, the terminal can displays the best-quality image.

However, as compared to paper documents, the above-described image encoder (electronic documents) can not easily be handled by the users. Hence, the image encoder can not widely be spread, so that the paperless processing can not widely and efficiently be performed.

In the case where the electronic document is stored in the image encoder, the user needs to affix a reference keyword (for search) to the document. The user may feel trouble to set a certain keyword, or may have some difficulty with it. In the case where an unsuitable keyword is attached to the electronic document, this document can not be searched out. For example, if a keyword of "good-looking cloth" which is a user's subjective and personal expression is attached to a predetermined electronic document, this electronic document can not searched out based on any of ordinary keywords, Usually, when people have the newspaper or magazine in their hand, they do not read only a target article in the newspaper or magazines. First, people briefly read the newspaper, find out an interesting article in the newspaper or magazines, and read the detail of, the article afterwards.

This reading manner can not be accepted for the image encoder. In the image likewise the case of paper documents. However, according to conventional image encoders, transmission or displaying of data requires a long period of time, so that users can not just freely read the plural document pages.

SUMMARY OF THE INVENTION

The present invention has been made in consideration of the above. It is accordingly an object of the present invention to provide an image encoder, an image encoding method, a recording medium and a computer data signal embodied in a carrier wave, for overcoming the above-described conventional technique, and for encoding an electronic document in accordance with human recognition characteristics, so that users can easily recognize a target electronic document and that the document can rapidly be displayed.

In order to achieve the above object, according to the first aspect of the present invention, there is provided an image encoder comprising:

an analyzer which analyzes image data, and classifies a plurality of unit areas of the image data into a plurality of attributes;

an encoder which encodes image data of each of the plurality to unit areas using a corresponding one of a plurality of progressive techniques, in accordance with a corresponding attribute classified by the analyzer; and a storage section which stores the image data encoded by the encoder in unit of each unit area.

According to this invention, the analyzer analyzes the image data (e.g. bitmap data), and classifies data of each of a plurality of unit areas (tiles) into any of (a plurality of attributes (e.g. a character attribute and a picture attribute). The encoder encodes data of each of the plurality of unit areas using a corresponding one of a plurality of progressive techniques (e.g. an SNR progressive technique and a resolution progressive technique), in accordance with the classified attribute. The storage section stores the image data which is encoded by the encoder in the unit of unit areas. Thus encoded image data is decoded using a corresponding progressive technique, based on the attribute of each unit area. For example, in the case where the attribute of a corresponding one of the plurality of unit areas is the character attribute, the data of the corresponding unit area is decoded using the SNR progressive technique. On the contrary, in the case where attribute is the picture attribute, the data of the corresponding unit area is decoded using a resolution progressive technique. Hence, in the image to be displayed on a predetermined display device, characters can be recognized by the user, before the data is completely decoded using the SNR progressive technique. On the other hand, pictures in the image can be recognized by the user, before the data is completely decoded using the resolution progressive technique. In this manner, an electronic document is encoded in consideration of the human recognition characteristics, so that users can easily recognize a target electronic document and that the document can rapidly be displayed.

In order to achieve the above object, according to the second aspect of the present invention, there is provided an image encoder comprising:

an analyzer which analyzes image data including at least one character area and one picture area, and classifies a plurality of unit areas into a character attribute indicating that the image data is in the character area or a picture attribute indicating that the image data is in the picture area;

an encoder which encodes image data of each of the plurality of unit areas using a corresponding one of two progressive techniques, in accordance with whether the analyzer classifies the image data into the character attribute or the picture attribute; and a storage section which stores the image data encoded by the encoder.

According to this invention, the analyzer analyzes image data (e.g. bitmap data) including at least one character area and one picture area, and classifies a plurality of unit areas (tiles) into a character attribute indicating that the image data is in the character area or a picture attribute indicating that the image data is in the picture area. The encoder encodes image data of each of the plurality of unit areas using a corresponding one of two progressive techniques (e.g. the SNR progressive technique and the resolution progressive technique), in accordance with whether the analyzer classifies the image data into the character attribute or the picture attribute. The storage section stores the image data encoded by the encoder. Thus encoded image data is decoded using a corresponding progressive technique, based on the attribute of each unit area. For example, in the case where the attribute of a corresponding one of the plurality of unit areas is the character attribute, the data of the corresponding unit area is decoded using the SNR progressive technique. On the contrary, in the case where attribute is the picture attribute, the data of the corresponding unit area is decoded using a resolution progressive technique. Hence, in the image to be displayed on a predetermined display device, characters can be recognized by the user, before the data is completely decoded using the SNR progressive technique. On the other hand, pictures in the image can be recognized by the user, before the data is completely decoded using the resolution progressive technique. In this manner, an electronic document is encoded in consideration of the human recognition characteristics, so that users can easily recognize a target electronic document and that the document can rapidly be displayed.

The encoder may:
- encode, in a case where the analyzer classifies a corresponding one of the plurality of unit areas into the character attribute, image data of the corresponding one of the plurality of unit areas using an SNR progressive technique; and
- encode, in a case where the analyzer classifies the corresponding one of the plurality of unit areas into the picture attribute, image data of the corresponding one of the plurality of unit areas using a resolution progressive technique.

In order to achieve the above object, according to the third aspect of the present invention, there is provided an image encoder comprising:

an analyzer which analyzes image data including at least one character area and at least one picture area, and classifies a plurality of unit areas into a character attribute indicating that the image data is in the character area or a picture attribute indicating that the image data is in the picture area;

a scalar quantization section which performs scalar quantization for image data of each of the plurality of unit areas using a corresponding one of two quantization coefficients, in accordance with whether the analyzer classifies the image data into the character attribute or the picture attribute;

an encoder which encodes the image data of each of the plurality of unit areas which is quantized by the scalar quantization section using a corresponding one of two progressive techniques, in accordance with whether the analyzer classifies the image data into the character attribute or the picture attribute;

a post quantization section which is performs post quantization for the image data of each of the plurality of unit areas which is encoded by the encoder using a corresponding one of two quantization parameters, in accordance with whether the analyzer classifies the image data into the character attribute or the picture attribute; and a storage section which stores the image data of each of the plurality of unit areas which is post quantized by the post quantization section.

According to this invention, an analyzer analyzes image data (e.g. bitmap data) including at least one character area and at least one picture area, and classifies a plurality of unit areas (tiles) into a character attribute indicating that the image data is in the character area or a picture attribute indicating that the image data is in the picture area. The scalar quantization section performs scalar quantization for image data of each of the plurality of unit areas using a corresponding one of two quantization coefficients (e.g. quantization coefficients for characters and pictures), in accordance with whether the analyzer classifies the image data into the character attribute or the picture attribute. The encoder which encodes the image data of each of the plurality of unit areas which is quantized by the scalar quantization section using a corresponding one of two progressive techniques, in accordance with whether the analyzer classifies the image data into the character attribute or the picture attribute. The post quantization section performs post quantization for the image data of each of the plurality of unit areas which is encoded by the encoder using a corresponding one of two quantization parameters (e.g. a parameter for characters and a parameter for pictures), in accordance with whether the analyzer classifies the image data into the character attribute or the picture attribute. The storage section stores the image data of each of the plurality of unit areas which is post quantized by the post quantization section. Thus encoded image data is decoded using a corresponding progressive technique, based on the attribute of each unit area. For example, in the case where the attribute of a corresponding one of the plurality of unit areas is the character attribute, the data of the corresponding unit area is decoded using the SNR progressive technique. On the contrary, in the case where attribute is the picture attribute, the data of the corresponding unit area is decoded using a resolution progressive technique. Hence, in the image to be displayed on a predetermined display device, characters can be recognized by the user, before the data is completely decoded using the SNR progressive technique. On the other hand, pictures in the image can be recognized by the user, before the data is completely decoded using the resolution progressive technique. In this manner, an electronic document is encoded in consideration of the human recognition characteristics, so that users can easily recognize a target electronic document and that the document can rapidly be displayed.

The scalar quantization section may perform scalar quantization for the image data of each of the plurality of unit areas using a predetermined quantization coefficient for characters, in a case where the analyzer classifies a corresponding one of the plurality of unit areas into the character attribute, and perform scalar quantization for the image data of each of the plurality of unit areas using a predetermined quantization coefficient for pictures, in a case where the analyzer classifies the corresponding one of the plurality of unit areas into the picture attribute;

the encoder may encode the image data of each of the plurality of unit areas using an SNR progressive technique, in a case where the analyzer classifies the corresponding one of the plurality of unit areas into the character attribute, and encode the image data of each of the plurality of unit areas using a resolution progressive technique, in a case where the analyzer classifies the corresponding one of the plurality of unit areas into the picture attribute; and the post quantization section may perform post quantization for the image data of each of the plurality of unit areas using a predetermined quantization parameter for characters, in a case where the analyzer classifies the corresponding one of the plurality of unit areas into the character attribute, and perform post quantization for the image data of each of the plurality of unit areas using a predetermined quantization parameter for pictures, in a case where the analyzer classifies the corresponding one, of the plurality of unit areas into the picture attribute.

The analyzer may analyze the image data including the at least one character area and at least one picture area in accordance with whether the image data represents a high-contrast image or a low-contrast image, classify a corresponding one of the plurality of unit areas into an high-contrast attribute indicating that the image data represents the high-contrast image or a low-contrast attribute indicating that the image data representing the low-contrast image;

the scalar quantization section may perform scalar quantization for the image data of each of the plurality of unit areas using a predetermined quantization coefficient for characters in a case where the analyzer classifies the corresponding one of the plurality of unit areas into the high-contrast attribute, and perform scalar quantization for the image data of each of the plurality of unit areas using a predetermined quantization coefficient for pictures, in a case where the analyzer classifies the corresponding one of the plurality of unit areas into the low-contrast attribute;

the encoder may encode the image data of each of the plurality of unit areas using an SNR progressive technique, in a case where the analyzer classifies the corresponding one of the plurality of unit areas into the high-contrast attribute, and encode the image data of each of the plurality of unit areas using a resolution progressive technique, in a case where the analyzer classifies the corresponding one of the plurality of unit areas into the low-contrast attribute; and the post quantization section may perform post quantization for the image data of each of the plurality of unit areas using a predetermined post quantization parameter for characters, in a case where the analyzer classifies the corresponding one of the plurality of unit areas into the high-contrast attribute, and perform post quantization for the image data of each of the plurality of unit areas using a predetermined post quantization parameter for pictures, in a case where the analyzer classifies the corresponding one of the plurality of unit areas into the low-contrast attribute.

The analyzer may analyze image data including at least one title area and at least one body-part area, classify a corresponding one of the plurality of unit areas into a body-part attribute indicating that the image data represents a body part of an electronic document to be processed or a title attribute indicating that the image data represents a title of the electronic document;

the scalar quantization section may perform scalar quantization for the image data of each of the plurality of unit areas using a predetermined quantization coefficient characters, in a case where the analyzer classifies the corresponding one of the plurality of unit areas into the body-part attribute, and perform scalar quantization for the image data of each of the plurality of unit areas using a predetermined quantization coefficient for a title, in a case where the analyzer classifies the corresponding one of the plurality of unit areas into the title attribute;

the encoder may encode the image data of each of the plurality of unit areas using an SNR progressive technique, in a case where the analyzer classifies the corresponding one of the plurality of unit areas into the body-part attribute, and encode the image data of each of the plurality of unit areas using a resolution progressive technique, in a case where the analyzer classifies the corresponding one of the plurality of unit areas into the title attribute; and the post quantization section may perform post quantization for the image data of each of the plurality of unit areas using a predetermined quantization parameter for characters, in a case where the analyzer classifies the corresponding one of the plurality of unit areas into the body-part attribute, and perform post quantization for the image data of each of the plurality of unit areas using a predetermined quantization parameter for a title, in a case where the analyzer classifies the corresponding one of the plurality of unit areas into the title attribute.

The analyzer may analyze image data including at least an inside-area and outside-area of a frame of an electronic document which is enclosed by a ruled line, and classify a corresponding one of the plurality of unit areas into an inside-area attribute indicating that the image data is inside the frame or an outside-area attribute indicating that the image data is outside the frame;

the scalar quantization section may perform scalar quantization for the image data of each of the plurality of unit areas using a predetermined quantization coefficient for the inside-area of the frame, in a case where the analyzer classifies the corresponding one of the plurality of unit areas into the inside-area attribute, and perform scalar quantization for the image data of each of the plurality of unit areas using a predetermined quantization coefficient for the outside-area of the frame, in a case where the analyzer classifies the corresponding one of the plurality of unit areas into the outside-area attribute;

the encoder may encode the image data of each of the plurality of unit areas using an SNR progressive technique, in a case where the analyzer classifies the corresponding one of the plurality of unit areas into the inside-area attribute, and encode the image data of each of the plurality of unit areas using a resolution progressive technique, in a case where the analyzer classifies the corresponding one of the plurality of unit areas into the outside-area attribute; and the post quantization section may perform post quantization for the image data of each of the plurality of unit areas using a predetermined quantization parameter for characters, in a case where the analyzer classifies the corresponding one of the plurality of unit areas into the inside-area attribute, and perform post quantization for the image data of each of the plurality of unit areas using a predetermined quantization parameter for the outside-area, in a case where the analyzer classifies the corresponding one of the plurality of unit areas into the outside-area attribute.

In order to achieve the above object, according to the fourth aspect of the present invention, there is provided an image encoder comprising:

analyzing means for analyzing image data, and classifying a plurality of unit areas of the image data into a plurality of attributes;

encoding means for encoding image data of each of the plurality of unit areas using a corresponding one of a plurality of progressive techniques, in accordance with a corresponding attribute classified by the analyzing means; and storage means for storing the image data encoded by the encoding means in unit of each unit area.

According to this invention, the analyzing means analyzes image data (e.g. bitmap data), and classifies a plurality of unit areas (tiles) of the image data into a plurality of attributes. The encoding means encodes image data of each of the plurality of unit areas using a corresponding one of a plurality of progressive techniques (the SNR progressive technique and the resolution progressive technique), in accordance with a corresponding attribute classified by the analyzing means. The storage means stores the image data encoded by the encoding means in unit of each unit area. Thus encoded image data is decoded using a corresponding progressive technique, based on the attribute of each unit area. For example, in the case where the attribute of a corresponding one of the plurality of unit areas is the character attribute, the data of the corresponding unit area is decoded using the SNR progressive technique. On the contrary, in the case where attribute is the picture attribute, the data of the corresponding unit area is decoded using a resolution progressive technique. Hence, in the image to be displayed on a predetermined display device, characters can he recognized by the user, before the data is completely decoded using the SNR progressive technique. On the other hand, pictures in the image can be recognized by the user, before the data is completely decoded using the resolution progressive technique. Tn this manner, an electronic document is encoded in consideration of the human recognition characteristics, so that users can easily recognize a target electronic document and that the document can rapidly be displayed.

In order to achieve the above object, according to the fifth aspect of the present invention, there is provided an image encoding method comprising:

analyzing image data, and classifying a plurality of unit areas of the image data into a plurality of attributes;

encoding image data of each of the plurality of unit areas using a corresponding one of a plurality or progressive techniques, in accordance with a corresponding attribute classified at the analyzing; and storing the image data encoded at the encoding in unit of each unit area, in a predetermined storage section.

According to this invention, the analyzing may include analyzing image data (e.g. bitmap data), and classifying a plurality of unit areas (tiles) of the image data into a plurality of attributes (e.g. a character attribute and a picture attribute). The encoding may include encoding image data of each of the plurality of unit areas using a corresponding one of a plurality of progressive techniques, in accordance with a corresponding attribute classified at the analyzing. The storing may include storing the image data encoded at the encoding in unit of each unit area, in a predetermined storage section. Thus encoded image data is decoded using a corresponding progressive technique, based oil the attribute of each unit area. For example, in the case where the attribute of a corresponding one of the plurality of unit areas is the character attribute, the data of the corresponding unit area is decoded using the SNR progressive technique. On the contrary, in the case where attribute is the picture attribute, the data of the corresponding unit area is decoded using a resolution progressive technique. Hence, in the image to be displayed on a predetermined display device, characters can be recognized by the user, before the data is completely decoded using the SNR progressive technique. On the other hand, pictures in the image can be recognized by the user, before the data is completely decoded using the resolution progressive technique. In this manner, an electronic document is encoded in consideration of the human recognition characteristics, so that users can easily recognize a target electronic document and that the document can rapidly be displayed.

In order to achieve the above object, according to the sixth aspect of the present invention, there is provided an image encoding method comprising:

analyzing image data, and classifying a plurality of unit areas of the image data into a plurality of attributes;

encoding image data of each of the plurality of unit areas using a corresponding one of a plurality of progressive techniques, in accordance with a corresponding attribute classified at the analyzing; and storing the image data encoded at the encoding in unit of each unit area, in a predetermined storage section.

According to this invention, the analyzing may include analyzing image data (e.g. bitmap data), and classifying a plurality of unit areas (tiles) of the image data into a plurality of attributes (e.g. a character attribute and a picture attribute). The encoding may include encoding image data of each of the plurality of unit areas using a corresponding one of a plurality of progressive techniques (e.g. the SNR progressive technique and the resolution progressive technique), in accordance with a corresponding attribute classified at the analyzing. The storing may include storing the image data encoded at the encoding in unit of each unit area, in a predetermined storage section.

Thus encoded image data is decoded using a corresponding progressive technique, based on the attribute of each unit area. For example, in the case where the attribute of a corresponding one of the plurality of unit areas is the character attribute, the data of the corresponding unit area is decoded using the SNR progressive technique. On the contrary, in the case where attribute is the picture attribute, the data of the corresponding unit area is decoded using a resolution progressive technique. Hence, in the image to be displayed on a predetermined display device, characters can be recognized by the user, before the data is completely decoded using the SNR progressive technique. On the other hand, pictures in the image can be recognized by the user, before the data is completely decoded using the resolution progressive technique. In this manner, an electronic document is encoded in consideration of the human recognition characteristics, so that users can easily recognize a target electronic document and that the document can rapidly be displayed.

The encoding may include:

encoding, in a case where a corresponding one of the plurality of unit areas is classified into the character attribute by the analyzing, image data of the corresponding one of the plurality of unit areas using an SNR progressive technique; and encoding, in a case where the corresponding one of the plurality of unit areas is classified into the picture attribute by the analyzing, image data of the corresponding one of the plurality of unit areas using a resolution progressive technique.

In order to achieve the above object, according to the seventh aspect of the present invention, there is provided an image encoding method comprising:

analyzing image data including at least one character area and at least one picture area, and classifying a plurality of unit areas into a character attribute indicating that the image data is in the character area or a picture attribute indicating that the image data is in the picture area;

performing scalar quantization for image data of each of the plurality of unit areas using a corresponding one of two quantization coefficients, in accordance with whether the image data is classified into the character attribute or the picture attribute at the analyzing;

encoding the image data of each of the plurality of unit areas which is quantized at the performing scalar quantization using a corresponding one of two progressive techniques, in accordance with whether the image data is classified into the character attribute or the picture attribute at the analyzing;

performing post quantization for the image data of each of the plurality of unit areas which is encoded at the encoding using a corresponding one of two quantization parameters, in accordance with whether the image data is classified into the character attribute or the picture attribute at the analyzing; and storing the image data of each of the plurality of unit areas which is post quantized at the performing post quantization, in a predetermined storage section.

According to this invention, the analyzing may include analyzing image data including at least one character area and at least one picture area, and classifying a plurality of unit areas into a character attribute indicating that the image data is in the character area or a picture attribute indicating that the image data is in the picture area, The performing scalar quantization may include performing scalar quantization for image data of each of the plurality of unit areas using a corresponding one of two quantization coefficients, in accordance with whether the image data is classified into the character attribute or the picture attribute at the analyzing. The encoding may include encoding the image data of each of the plurality of unit areas which is quantized at the performing scalar quantization using a corresponding one or two progressive techniques, in accordance with whether the image data is classified into the character attribute or the picture attribute at the analyzing. The performing post quantization may include performing post quantization for the image data of each of the plurality of unit areas which is encoded at the encoding using a corresponding one of two quantization parameters, in accordance with whether the image data is classified into the character attribute or the picture attribute at the analyzing. The storing may include storing the image data of each of the plurality of unit areas which is post quantized at the performing post quantization, in a predetermined storage section. Thus encoded image data is decoded using a corresponding progressive technique, based on the attribute of each unit area. For example, in the case where the attribute of a corresponding one of the plurality of unit areas is the character attribute, the data of the corresponding unit area is decoded using the SNR progressive technique. On the contrary, in the case where attribute is the picture attribute, the data of the corresponding unit area is decoded using a resolution progressive technique. Hence, in the image to be displayed on a predetermined display device, characters can be recognized by the user, before the data is completely decoded using the SNR progressive technique. On the other hand, pictures in the image can be recognized by the user, before the data is completely decoded using the resolution progressive technique. In this manner, an electronic document is encoded in consideration of the human recognition characteristics, so that users can easily recognize a target electronic document and that the document can rapidly be displayed.

The performing scalar quantization may include performing scalar quantization for the image data of each of the plurality of unit areas using a predetermined quantization coefficient for characters, in a case where a corresponding one of the plurality of unit areas is classified into the character attribute at the analyzing, and performing scalar quantization for the image data or each of the plurality of unit areas using a predetermined quantization coefficient for pictures, in a case where the corresponding one of the plurality of unit areas is classified into the picture attribute at the analyzing;

the encoding may include encoding the image data of each of the plurality of unit areas using an SNR progressive technique, in a case where the corresponding one of the plurality of unit areas is classified into the character attribute at the analyzing, and encoding the image data of each of the plurality of unit areas using a resolution progressive technique, in a case where the corresponding one of the plurality of unit areas is classified into the picture attribute at the analyzing; and the performing post quantization section may include performing post quantization for the image data of each of the plurality of unit areas using a predetermined quantization parameter for characters, in a case where the corresponding one of the plurality of unit areas is classified into the character attribute at the analyzing, and performing post quantization for the image data of each of the plurality of unit areas using a predetermined quantization parameter for pictures, in a case where the corresponding one of the plurality of unit areas is classified into the picture attribute at the analyzing.

The analyzing may include analyzing the image data including the at least one character area and at least one picture area in accordance with whether the image data represents a high-contrast image or a low-contrast image, classifying a corresponding one of the plurality of unit areas into an high-contrast attribute indicating that the image data represents the high-contrast image or a low-contrast attribute indicating that the image data representing the low-contrast image;

the performing scalar quantization may include performing scalar quantization for the image data of each of the plurality of unit areas using a predetermined quantization coefficient for characters in a case where the corresponding one of the plurality of unit areas is classified into the high-contrast attribute at the analyzing, and performing scalar quantization for the image data of each of the plurality of unit areas using a predetermined quantization coefficient for pictures, in a case where the corresponding one of the plurality of unit areas is classified into the low-contrast attribute at the analyzing;

the encoding may include encoding the image data or each of the plurality of unit areas using an SNR progressive technique, in a case where the corresponding one of the plurality of unit areas is classified into the high-contrast attribute at the analyzing, and encoding the image data of each of the plurality of unit areas using a resolution progressive technique, in a case where the corresponding one of the plurality or unit areas is classified into the low-contrast attribute at the analyzing; and the performing post quantization may include performing post quantization for the image data of each of the plurality of unit areas using a predetermined post quantization parameter for characters in a case where the corresponding one of the plurality of unit areas is classified into the high-contrast attribute at the analyzing, and performing post quantization for the image data of each of the plurality of unit areas using a predetermined post quantization parameter for pictures, in a case where the corresponding one of the plurality of unit areas is classified into the low-contrast attribute at the analyzing.

The analyzing may include analyzing image data including at least one title area and at least one body-part area, classifying a corresponding one of the plurality of unit areas into a body-part attribute indicating that the image data represents a body part of an electronic document to be processed or a title attribute indicating that the image data represents a title of the electronic document;

the performing scalar quantization section may include performing scalar quantization for the image data of each of the plurality of unit areas using a predetermined quantization coefficient characters, in a case where the corresponding one of the plurality of unit areas is classified into the body-part attribute at the analyzer, and performing scalar quantization for the image data of each of the plurality of unit areas using a predetermined quantization coefficient for a title, in a case where the corresponding one of the plurality of unit areas is classified into the title attribute at the analyzing;

the encoding may include encoding the image data of each of the plurality of unit areas using an SNR progressive technique, in a case where the corresponding one of the plurality of unit areas is classified into the body-part attribute at the analyzing, and encoding the image data of each of the plurality of unit areas using a resolution progressive technique, in a case where the corresponding one of the plurality of unit areas is classified into the title attribute at the analyzing; and the performing post quantization section may include performing post quantization for the image data of each of the plurality of unit areas using a predetermined quantization parameter for characters, in a case where the corresponding one of the plurality of unit areas is classified into the body-past attribute at the analyzing, and performing post quantization for the image data of each of the plurality of unit areas using a predetermined quantization parameter for a title, in a case where the corresponding one of the plurality of unit areas is classified into the title attribute at the analyzing.

The analyzing may include analyzing image data including at least an inside-area and outside-area of a frame of an electronic document which is enclosed by a ruled line, and classifying a corresponding one of the plurality of unit areas into an inside-area attribute indicating that the image data is inside the frame or an outside-area attribute indicating that the image data is outside the frame;

the performing scalar quantization section may include performing scalar quantization for the image data of each of the plurality of unit areas using a predetermined quantization coefficient for the inside-area of the frame, in a case where the corresponding one of the plurality of unit areas is classified into the inside-area attribute at the analyzing, and performing scalar quantization for the image data of each of the plurality of unit areas using a predetermined quantization coefficient for the outside-area of the frame, in a case where the corresponding one of the plurality of unit areas is classified into the outside-area attribute at the analyzing;

the encoding, may include encoding the image data of each of the plurality of unit areas using an SNR progressive technique, in a case where the corresponding one of the plurality of unit areas is classified into the inside-area attribute at the analyzing, and encoding the image data of each for the plurality of unit areas using a resolution progressive technique, in a case where the corresponding one of the plurality of unit areas is classified into the outside-area attribute at the analyzing; and the performing post quantization section may include performing post quantization for the image data of each of the plurality of unit areas using a predetermined quantization parameter for characters, in a case where the corresponding one of the plurality of unit areas is classified into the inside-area attribute at the analyzing, and performing post quantization for the image data of each of the plurality of unit areas using a predetermined quantization parameter for the outside-area, in a case where the corresponding one of the plurality of unit areas is classified into the outside-area attribute at the analyzing.

In order to achieve the above object, according to the eighth aspect of the present invention, there is provided a computer readable recording medium which records a program for controlling a computer to execute an image encoding method comprising:

analyzing image data, and classifying a plurality of unit areas of the image data into a plurality of attributes;

encoding image data of each of the plurality of unit areas using a corresponding one of a plurality of progressive techniques, in accordance with a corresponding attribute classified at the analyzing; and storing the image data encoded at the encoding in unit of each unit area, in a predetermined storage section.

In order to achieve the above object, according to the ninth aspect of the present invention, there is provided a computer data signal embodied in a carrier wave and representing an instruction sequence for controlling a computer to execute an image encoding method comprising:

analyzing image data, and classifying a plurality of unit areas of the image data into a plurality of attributes;

encoding image data of each of the plurality of unit areas using a corresponding one of a plurality of progressive techniques, in accordance with a corresponding attribute classified at the analyzing; and storing the image data encoded at the encoding in unit of each unit area, in a predetermined storage section.

BRIEF DESCRIPTION OF THE DRAWINGS

The object and other objects and advantages of the present invention will become more apparent upon reading of the following detailed description and the accompanying drawings in which:

FIG. 6 is an exemplary diagram for explaining the state of the bitmap data wherein each area is divided into a plurality of tiles;

DETAILED DESCRIPTION OF THE PREFERRED EMBODIMENTS

Figure 1:
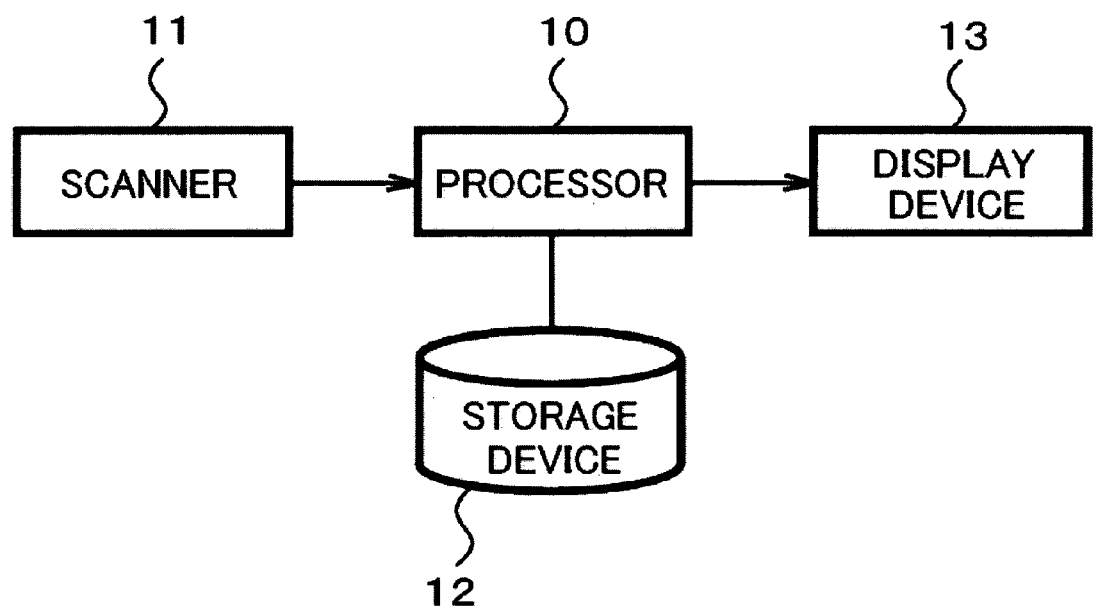
FIG. 1 is a block diagram showing an example of the structure of an image encoder according to each of the first to fourth embodiments of the present invention.

Preferred embodiments of the present invention will now be specifically be explained with reference to the accompanying drawings. Note that the standard of JPEG (Joint Picture Expert Group) 2000 is used in the preferred embodiments of the present invention.

Explanations will now be made to a progressive transmission technique which is employed in the embodiments of the present invention.

The progressive transmission technique is a method of transmitting and displaying a low-quality image whose resolution, gradation and frequency bandwidth are not initially in a sufficient level. According to such a progressive transmission technique, subsequently, additional information is gradually transmitted piece by piece to improve the quality of the image, and then the image with the best quality can be transmitted and displayed.

According to the JPEG2000(part1) standard, there are five progressive procedures each including a combination of a resolution level; the precinct (position); the component; and the layer, in a predetermined order. An SNR (Signal to Noise Ratio progressive) transmission technique and a resolution progressive technique will now be described.

The SNR progressive technique includes a Layer-Resolution-Component-Position (LRCP) progressive procedure, for encoding data from the most significant bit plane. If an image is displayed using the SNR progressive transmission technique, the user sees the image and notices that the image having a gradually-increasing-number of colors is displayed.

In the case where an electronic document including both character data and picture data (data excluding character data) is displayed using the SNR progressive transmission technique, the picture can not be recognized until the required colors are visualized appear, because it is necessary to identify the middle tones of the image. On the other hand, since the edges of the characters are emphasized, characters can be recognized even before the colors are not completely visualized.

The resolution progressive technique includes an Resolution-Layer-Component-Position (RLCP) progressive procedure, for performing encoding gradually from a low resolution level, using multi-resolution processing of wavelet transformation. Note, according to this technique, that an image is compressed in accordance with the detail and roughness of dots or the image. In the case where the image is displayed using the resolution progressive technique, the resolution of the image gradually increases from a low resolution level, so that the user recognizes that the image gradually gets in focus from its out-of-locus state.

In the case where the electronic document including both the character data and picture data (data excluding characters) is displayed using the resolution progressive technique, the picture can briefly be recognized, even if the picture is somehow out of focus. On the other hand, the characters can not be recognized, unless they are highly in focus.

An image encoder according to embodiments of the present invention displays electronic documents including both character data and picture data (data excluding characters), using the features of the above-described progressive techniques. That is, the image encoder transmits and displays the character data included in the character area using the SNR progressive technique, and transmits and displays picture information included in the picture area using the resolution progressive technique. By this, the user can easily recognize the contents or the transmission electronic documents, even before they are completely displayed (transmitted).

A quantization technique which is used in the preferred embodiments will now be described. In the JPEG2000 standard, quantization is performed for reducing the dynamic range of coefficients. In the JPEG2000 standard, there are defined two kinds of quantization, such as scalar quantization and post quantization.

The scalar quantization is carried out for wavelet-transformed coefficients, to achieve high-efficiency compression. This well-known scalar quantization is done in the unit of pixels, and various quantization techniques have been proposed.

The image encoder of the embodiments sets a coefficient ($\geq 1$) specifying the quantization step size, in accordance with whether the target data to be scalar quantized is character data or picture data, and perform quantization in conformity with the target data.

Specifically, in the case of character data, the image encoder quantizes the target data using a small coefficient, such as a predetermined value around "1", etc. That is, the image encoder performs the quantization at a low compression ratio. In an extreme example, the quantization is not performed, in the case where the target data to be quantized is character data, (i.e., a coefficient "1" is used).

In the case where the target data to be quantized is picture data, the image encoder quantizes the target data using a large coefficient, i.e. compresses the data using a high compression ratio. In the case of picture data, even if the target data is compressed using a high compression ratio, the data can be processed in a preferable manner without being seriously influenced by the high compression ratio.

The post quantization is achieved, by discarding the least significant bit plane of a complete form of a code string, in the context that the bit plane is encoded after the quantization.

In the scalar quantization, it is necessary to perform encoding while appropriately changing the quantization step size, in order to control an amount of predetermined data.

In the post quantization, the quantization is performed for the code string after encoded, there is no need to perform encoding again. The post quantization has the characteristic that controlling of the amount of data can be realized in a single path.

The image encoder according to the embodiments of the present invention sets a parameter ($\geq 1$) in accordance with whether the target data to be post quantized is character data or picture data, and perform quantization suitably and in conformity with the target data. Specifically, the image encoder sets a small parameter in the case of the picture data, thereby discarding very few bit planes, and achieves the quantization. In an extreme example, the quantization is not performed (sets "1" as a parameter), in the case where the target data is picture data.

On the other hand, in the case where the target data is character data, quantization is performed while setting a large value as a parameter. In this case, a greater amount of information is discarded than the case of the picture data, however, the character data can be processed in a preferable manner without being seriously influenced by the set large value as a parameter.

First Embodiment

The structure of an image encoder according to the first embodiment of the present invention will now be described.

FIG. 1 is a block diagram showing the schematic structure of the image encoder of this embodiment. As shown in FIG. 1, the image encoder comprises a processor 10, a scanner 11, a storage device 12 and a display device 13.

The processor 10 includes a computer, such as a personal computer, a workstation, a general computer, etc. In the case where the image encoder of this embodiment is an incorporated device, such as a mollification facsimile device or a multifunction device including a multifunction device and a printer, the processor 10 may include an internally-installed CPU (Central Processing Unit) or an LSI (Large Scale Integration) only for image encoding.

Figure 2:
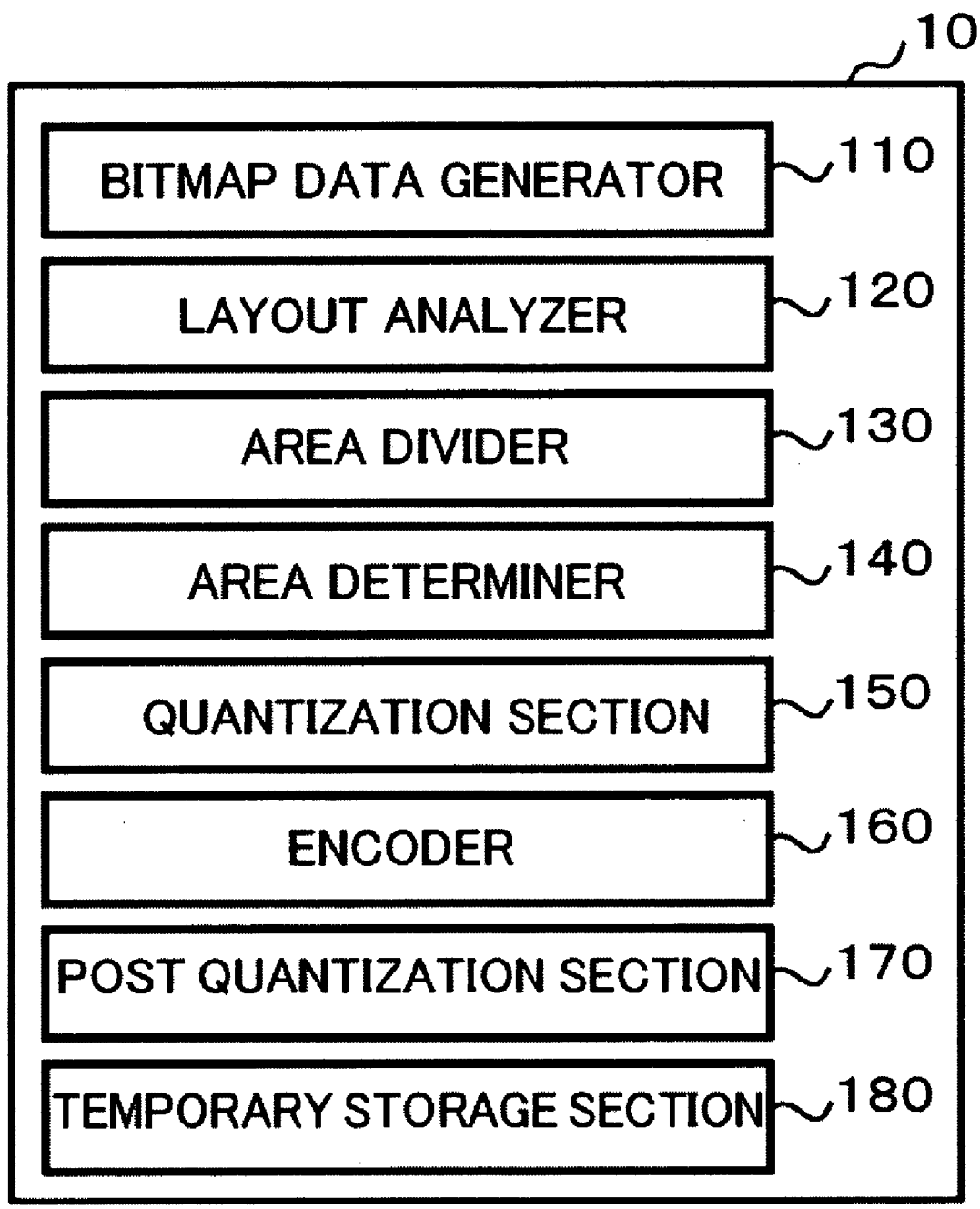
FIG. 2 is a block diagram showing an example of the specific structure of a processor included in the image encoder of FIG. 1.

The processor 10 controls the entire section of the image encoder. Specifically, the processor 10 is configured to include, as shown in FIG. 2, a bitmap data generator 110, a layout analyzer 120, an area divider 130, an area determiner 140, a quantization section 150, an encoder 160, a post quantization section 170, and a temporary-storage section 180.

The bitmap data generator 110 generates bitmap data based on image signals sent from the scanner 11. The bitmap data generator 110 stores the generated bitmap data in the temporary-storage section 180.

The layout analyzer 120 performs layout analysis based on the bitmap data stored in the temporary-storage section 180, and classifies pieces of the bitmap data into a character area and a picture (for data except character data) area.

The area divider 130 divides each of the character area and the picture data into a plurality of tiles (unit area).

The area determine 140 determines whether each of the plurality of tiles is in the character area or the picture area.

The quantization section 150 performs the scalar quantization for characters or for pictures, in accordance with the determination of the area determiner 140. Note that the quantization section 150 performs DWT (Discrete Wavelet Transformation) before performing the scalar quantization.

The encoder 160 performs encoding for each tile, using the SNR progressive technique or the resolution progressive technique in accordance with the determination of the area determiner 140.

The post quantization section 170 performs post quantization for each tile, using a quantization parameter for characters or a quantization parameter for pictures in accordance with the determination of the area determiner 140.

The temporary-storage section 180 includes a work memory, and temporarily stores the bitmap data generated by the bitmap data generator 110.

Operations of the above-described processor 10 will more specifically be described with reference to an encoding process, as will be described later.

The scanner 11 scans the characters, symbols, figures, pictures, etc. which are printed on a paper medium, etc., and sends resultant image signals acquired as a result of the scanning to the processor 10.

The storage device 12 stores encoded data (encoded electronic document) supplied from the processor 10. The encoded stored in this storage device 12 is read out by the processor 10, and supplied to the display device 13.

Upon reception of the encoded data, the display device 13 reproduces and displays an electronic document based on encoded data supplied from the processor 10. The display device 13 and the processor 10 may be directly connected with each other through a wire, in a wireless manner, or through a network, such as a public line or the Internet.

Operations of the image encoder according to the first embodiment of the present invention will now be explained with reference to FIG. 3.

Figure 3:
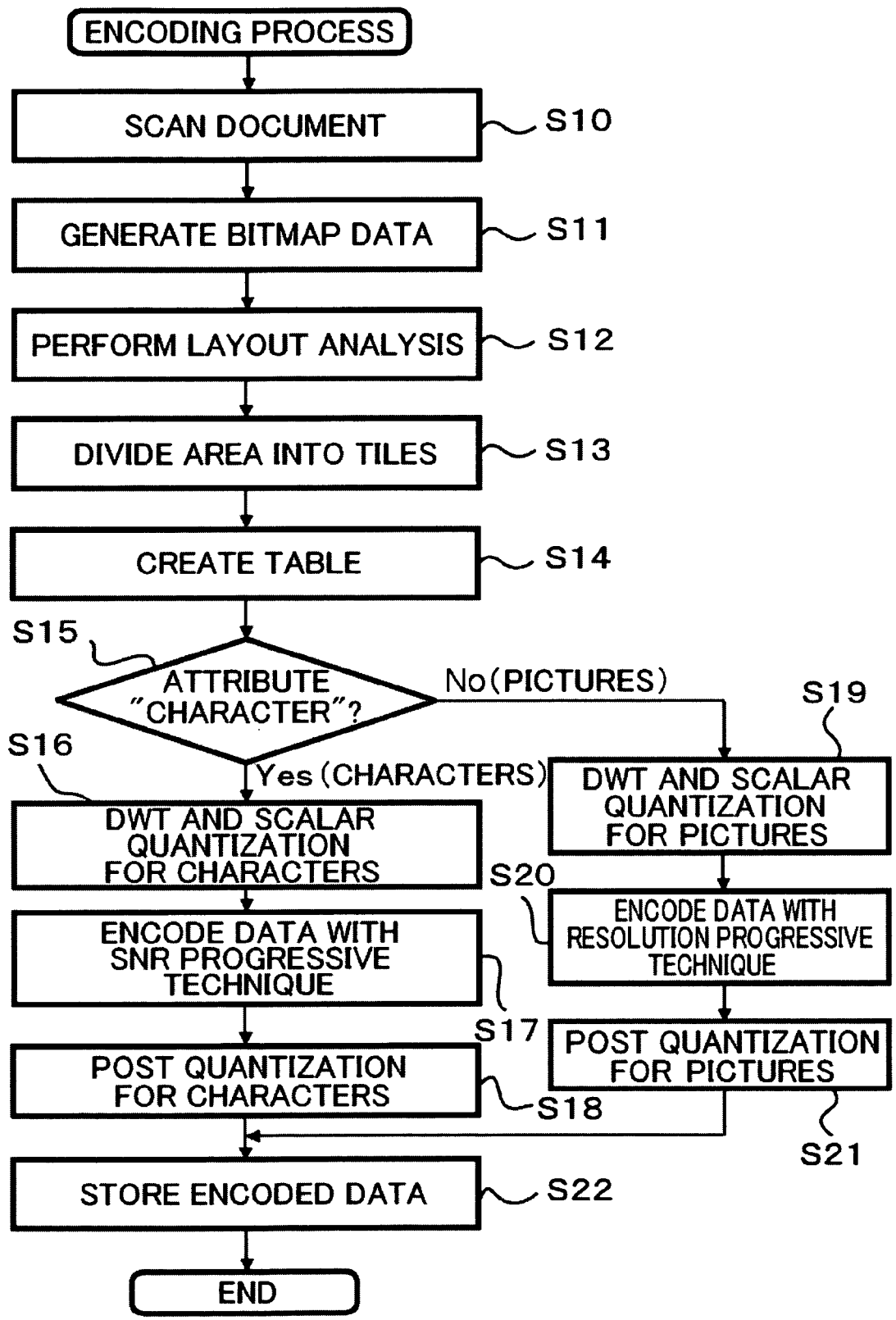
FIG. 3 is a flowchart for explaining an encoding process which is carried out by the image encoder according to the first embodiment of the present invention.

FIG. 3 is a flowchart for explaining the encoding process executed by the image encoder of this embodiment.

Figure 4:
FIG. 4 is an exemplary diagram showing an example of a paper document including both a character area and a picture (data except characters) area.

The scanner 11 scans a target paper document to be digitized (Step S10). That is, the scanner 11 scans a paper document including both the characters and pictures (information except characters), as that shown in FIG. 4. The scanner 11 sends image signals obtained as a result of this scanning, to the processor 10.

The processor 10 generates bitmap data from the sent image signals (Step S11). The processor 10 temporarily stores the generated bitmap data in its internal work memory (the temporary storage section 180).

The processor 10 performs layout analysis of the document, based on the bitmap data stored in the work memory using the OCR (Optical Character Recognition) technique (Step S12). As a result or this layout analysis, pieces of the bitmap data are classified into the character area and the picture area.

Figure 5:
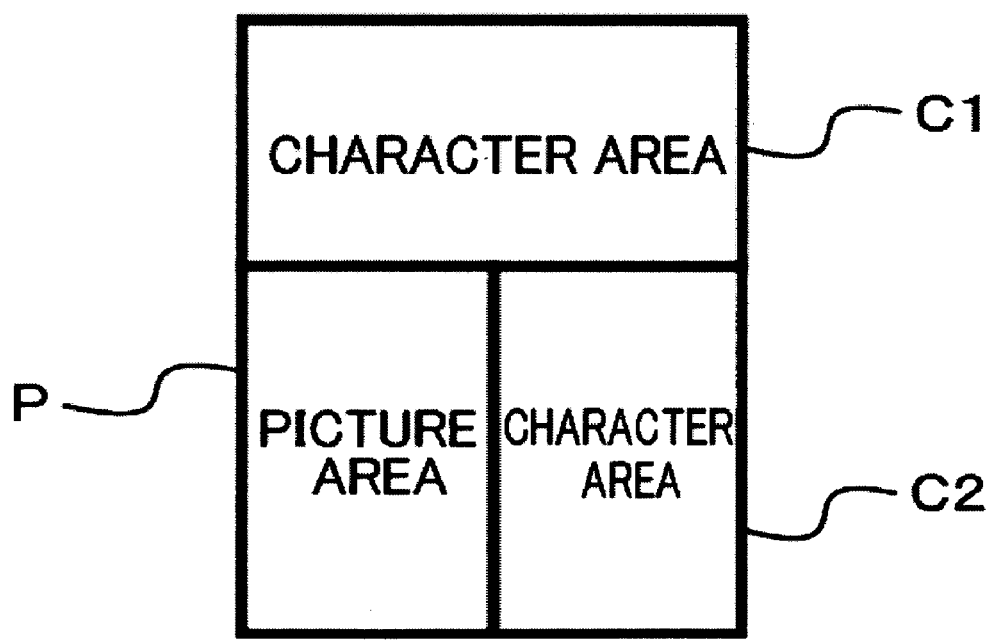
FIG. 5 is an exemplary diagram for explaining the state of bitmap data that is classified into character areas and picture area as a result of layout analysis.

For example, as shown in FIG. 5, the pieces of the bitmap data are classified into three areas of a picture area "P", a character area "C1" and a character area "C2". The processor 10 sets the attribute of each area as "Character" or "Picture (data except characters)". Any of the attributes is affixed to a corresponding encoded electronic document.

The processor 10 divides each of the above-described areas into a plurality of tiles, as a pre-process for performing encoding in the JPEG2000 standard (Step S13). FIG. 6 shows an example of tile-division. As shown in FIG. 6, the picture area "P" is divided into six tiles T, the character area "C1" is divided into eight tiles T, and the character area "C2" is divided into six tiles T. The size of each tile T is the same.

The tile-dividing method and the shape of the tiles are not limited to the exemplary case of FIG. 6, and are arbitrary (any of various tile-dividing methods and any of various shapes can be used).

Referring back to FIG. 3, the processor 10 affixes analysis information to each tile (the bitmap data included in each tile) (Step S14). Note that the analysis information expresses, for example, "0" as a character and "1" as a picture.

For example, the processor 10 creates a table including a predetermined number of data items which is the same as the number of tiles of image data, and affixes the analysis information to the table in association with the tile numbers. In this case, the tile numbers are a kind of parameters, of SOT marker segments defined in the JPEG2000 standard, and are numbers assigned in the raster order from "0". The processor 10 creates a table including the analysis information in association with each tile number, and stores the created table in the internal work memory (the temporary storage section 180).

The processor 10 refers to one tile from the work memory, and determines whether the attribute of the tile is "Character" (Step S15). That is, the processor 10 performs the determination of the attribute, by referring to the above-described table.

In the case where the attribute of the tile is "Character", the processor 10 performs DWT for the tile, and carries out the scalar quantization for characters (Step S16). During this DWT, the processor 10 transforms the data of the tile into a plurality of coefficients. After this, the processor 10 performs the scalar quantization for the coefficients obtained as a result of the transformation, using a quantization coefficient for characters. In this case, the quantization coefficient for characters is such a value that the quantization can not be performed or such a small value that data compression is performed at a low compression ratio.

The processor 10 encodes the obtained coefficients using the SNR progressive technique (Step S17). The specific encoding method may be set with reference to the description of the SNR progressive technique according to the above-described JPEG2000 standard of the specification of the JPEG2000 standard.

The processor 10 performs the post quantization using the quantization parameter for characters, for the encoded data (Step S18). In this case, as the quantization parameter for characters, a parameter of a large value is used so that data compression is performed at a high compression ratio. As a result of the encoding and quantization, it is possible to control the amount of data to be encoded and the image quality of data which are included in those "Character" tiles. This controlling can be achieved without influencing of the viewing by the user.

In the above-described step S15, in the case where it is determined that the attribute of the tile is not "Character", i.e. the attribute is "Picture", the processor 10 performs the DWT for the tile and performs scalar quantization for pictures (Step S19). That is, the processor 10 transforms the data in the tile into a plurality of coefficients using the DWT technique. After this, the processor 10 performs scalar replantation using a quantization coefficient for pictures, for the resultant coefficients. In this case, the quantization coefficient for pictures is such a large value that data compression is performed at a high expression ratio.

The processor 10 encodes the quantized coefficients using a resolution progressive technique (Step S20). The specific encoding method may be set with reference to the description of the SNR progressive technique according to the above-described JPEG2000 standard of the specification of the JPEG2000 standard.

The processor 10 performs post quantization for the encoded data, using a quantization parameter for pictures (Step S21). In this case, the quantization parameter for pictures is such a small value that data compression is achieved at a low compression ratio. That is, the quantization parameter for pictures is smaller than that for characters. As a result of the encoding and quantization, it is possible to control the amount of data to be encoded and the image quality of data which are included in the "Picture" tiles, without influencing the viewing by the user.

The processor 10 stores the encoded data quantized in the above-described step S18 or the step S21, in the storage device 12 (Step S22).

The processor 10 executes the procedures of the above-described steps S15 to S22, for each of the plurality of tiles. In the case where it is determined the attribute or a target tile is "Character", the processor 10 encodes the data in the tile using the SNR progressive technique. On the contrary, in the case where it is determined that the attribute of a corresponding tile is "Picture", the processor 10 encodes the data in the tile using the resolution progressive technique. After the encoding, the processor 10 stores thus encoded electronic document in the storage device 12.

After this, the processor 10 decodes thus encoded electronic document stored in the storage device 12 and displays the decoded document on the display device, in response to a request therefor from the user. At this time, the processor 10 decodes the electronic document using a corresponding progressive technique, based on the attribute of each tile. That is, the processor 10 performs the decoding using the SNR progressive technique, in the case where the attribute of a target tile is "Character". On the contrary, the processor 10 performs the decoding using the resolution progressive technique, in the case where the attribute of a target tile is "Picture".

As a result of the above, in the electronic document to be displayed on the display device 13, those characters can be recognized by the user before the data is completely decoded using the SNR progressive technique, and those pictures can be recognized by the user before the data is completely decoded using the resolution progressive technique.

As described above, the image encoder according to the first embodiment of the present invention encodes the electronic document, using different progressive techniques in the character area and the picture area. That is, the SNR progressive technique is employed in the character area, while the resolution progressive technique is employed in the picture area.

Hence, when decoding the encoded electronic document, suitable decoding techniques can be employed for the characters and pictures, respectively. As a result of this, the user can soon recognize the contents of the electronic document including both characters and pictures (information except characters).

In the encoding process, the encoded data is compressed using the post quantization technique, the amount of data to be encoded can easily be controlled. Particularly, in the character area, data compression can he achieved at a higher compression ratio than that in the picture area, using the post quantization. Hence, an electronic document including a large number of characters (a wide range of character area) can rapidly be transmitted and displayed.

In the above-described first embodiment, the explanations have been made to the image encoder, in the case where attribute information is affixed to each tile in association with each other. However, information, representing a selection manner for suitably adapting a progressive technique to/from another progressive technique, may be affixed to each of the plurality of tiles. In this case, it is not necessary to prepare a table storing information regarding the tiles and their attributes in association with each other, and hence simplifying the structure or processing procedures of the image encoder.

In the above-described first embodiment, the image encoder has been explained, in the case where both of the SNR progressive technique and the resolution progressive technique are employed for displaying and transmitting the data. However, any other progressive techniques may be used in a manner corresponding to the characters and pictures of the tiles. For example, of five progressive procedures defined in the JPEG2000 (part1, etc.), an arbitrary procedure may be employed, or any other suitable progressive technique may be used.

Second Embodiment

An image encoder according to the second embodiment of the present invention will now be described. The image encoder of the second embodiment has the same structure as that described in the first embodiment shown in FIG. 1.

One feature of the image encoder according to the second embodiment of the present invention is that a suitable progressive technique is selected and adapted in accordance with the contrast level in the electronic document. Specifically, the processor 10 performs layout analysis, and selects one of the SNR progressive technique and the resolution progressive technique, in accordance with the contrast level in the document.

Operations of the image encoder according to the second embodiment of the present invention will now be described with reference to FIG. 7.

Figure 7:
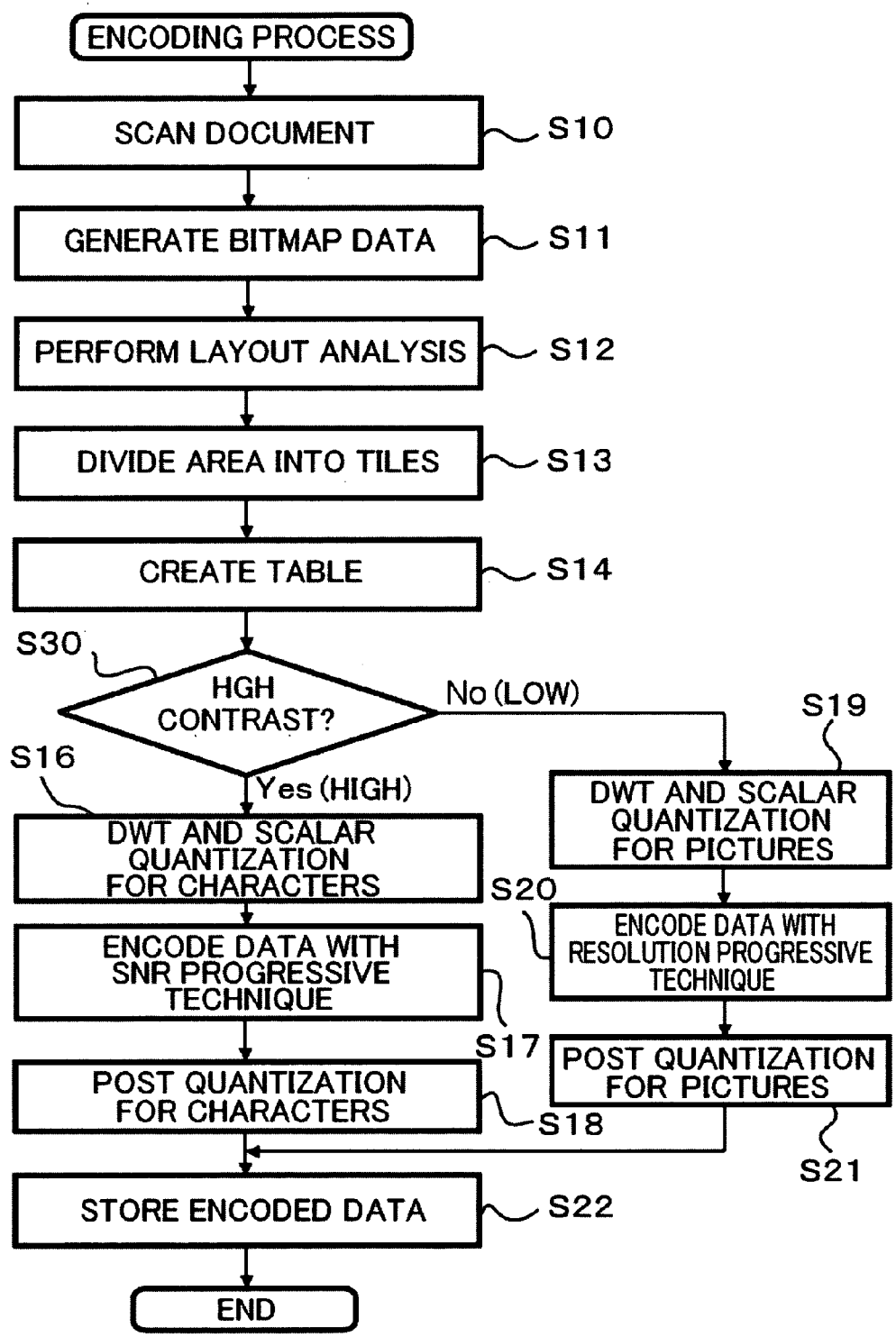
FIG. 7 is a flowchart for explaining an encoding process which is carried out by the image encoder according to the second embodiment of the present invention.

FIG. 7 is a flowchart for explaining an encoding process which is carried out by the image encoder of the second embodiment. In the encoding process of FIG. 7, the same (or corresponding) procedures as those of the encoding process in the case of the first embodiment are denoted by the same reference numerals as those shown in FIG. 3.

The scanner 11 scans a target paper document to be digitized (Step S10), and sends image signals obtained by the scanning to the processor 10.

The processor 10 generates bitmap data from the sent image signals (Step S11), and performs the layout analysis based on the generated bitmap data (Step S12). That is, the processor 10 performs the layout analysis, on the basis of the contrast level in the document. As a result of this layout analysis, the character area is classified into a "high-contrast area", whereas the picture area is classified into a "low-contrast area".

The processor 10 divides each of the above areas into a plurality of tiles (Step S13), and affixes analysis information to each tile (bitmap data included in each tile) (Step S14).

The processor 10 creates analysis information defining "0" as a high-contrast area and "1" as a low-contrast area in association with each tile number, and stores the created table in the internal work memory (the temporary storage section 180).

The processor 10 refers to one tile from the work memory, and determines whether this tile is in the high-contrast area (Step S30). This determination is made, every time the processor 10 refers the above-described table.

In the case where it is determined that the tile is in the high-contrast area, the processor 10 performs the DWT and the scalar quantization for characters for this tile (Step S16). That is, likewise the first embodiment, the processor 10 performs the DWT for the data included in the tile, thereby transforming the data into a plurality or coefficients, and performs scalar quantization for the obtained coefficients using a quantization coefficient for characters. In this case, the quantization coefficient is the same as that described in the first embodiment.

The processor 10 encodes the quantized coefficients using the SNR progressive technique (S17), and performs post quantization for the encoded data using a quantization parameter for characters (Step S18). The quantization parameter for characters is also the same as that described in the first embodiment.

In the above-described step S30, in the case where it is determined that the tile is not in the high-contrast area (in the low-contrast area), the processor 10 performs the DWT and the scalar quantization for pictures for this tile (Step S19). Likewise the case of the first embodiment, the processor 10 performs DWT for the data included in the tile, thereby transforming the data into a plurality of coefficients. After this, the processor 10 performs scalar quantization for the obtained coefficients using a quantization coefficient for pictures. This quantization coefficient for pictures is also the same as that described in the first embodiment.

The processor 10 encodes the quantized coefficients using the resolution progressive technique (Step S20), and performs post quantization for the encoded data using the quantization parameter for pictures (Step S21). The quantization parameter for pictures is the same as that described in the first embodiment.

The processor 10 stores the encoded data quantized in the above-described step S18 and the Step S21 in the storage device 12 (Step S22).

The processor 10 executes the procedures of the above steps S30 to S22 for each of the plurality of tiles. That is, in the case where it is determined that a target tile is in the high-contrast area, the processor 10 encodes the data of the tile using the SNR progressive technique. On the contrary, in the case where it is determined that a target tile is in the low-contrast area, the processor 10 encodes the data of the tile using the resolution progressive technique. Then, the processor 10 stores thus encoded electronic document in the storage device 12.

After this, the processor 10 decodes the encoded electronic document stored in the storage device 12 and displays the decoded document on the display device 13, in response to a request therefor from the user. At this time, the processor 10 performs decoding using a suitable progressive technique, in accordance with the contrast level of each tile. That is, in the case where it is determined that the target tile is in the high-contrast area, the processor 10 assumes that the tile is in the character area, and decodes the data of the tile using the SNR progressive technique, on the contrary, in the case where it is determined that the target tile is in the low-contrast area, the processor 10 assumes that the tile is in the picture area, and decodes the data of the tile using the resolution progressive technique.

As a result of this, in the electronic document displayed on the display device 13, those characters can sufficiently be recognized by the user before the data is completely decoded using the SNR progressive technique, and those pictures call sufficiently be recognized by the user before the data is completely decoded using the resolution progressive technique.

As described above, the image encoder according to the second embodiment of the present invention encodes the electronic document, using different progressive techniques in the high-contrast area (character area) and the low-contrast area (picture area). That is, the processor 10 encodes data included in the character area using the SNR progressive technique, and encodes data included in the picture area using the resolution progressive technique.

When decoding the encoded electronic document, characters and pictures can be decoded using suitable decoding techniques, respectively. As a result of this, the user can soon recognize the contents of the electronic document including both the characters and pictures.

Third Embodiment

An image encoder according to the third embodiment of the present invention will now be explained. The image encoder of this embodiment has the same structure as the structure of the image encoder according to the first embodiment which is shown in FIG. 1.

One feature of the image encoder of this embodiment is that a suitable progressive technique is selected, in accordance with whether target data is a title or the body part of an electronic document. Specifically, the processor 10 performs the layout analysis in accordance with whether the target data is a title or the body part of the electronic document. Based on the result of the analysis, the processor 10 employs the SNR progressive technique or the resolution progressive technique, for encoding the target data.

Operations of the image encoder according to the third embodiment of the present invention will now be explained with reference to FIG. 8.

Figure 8:
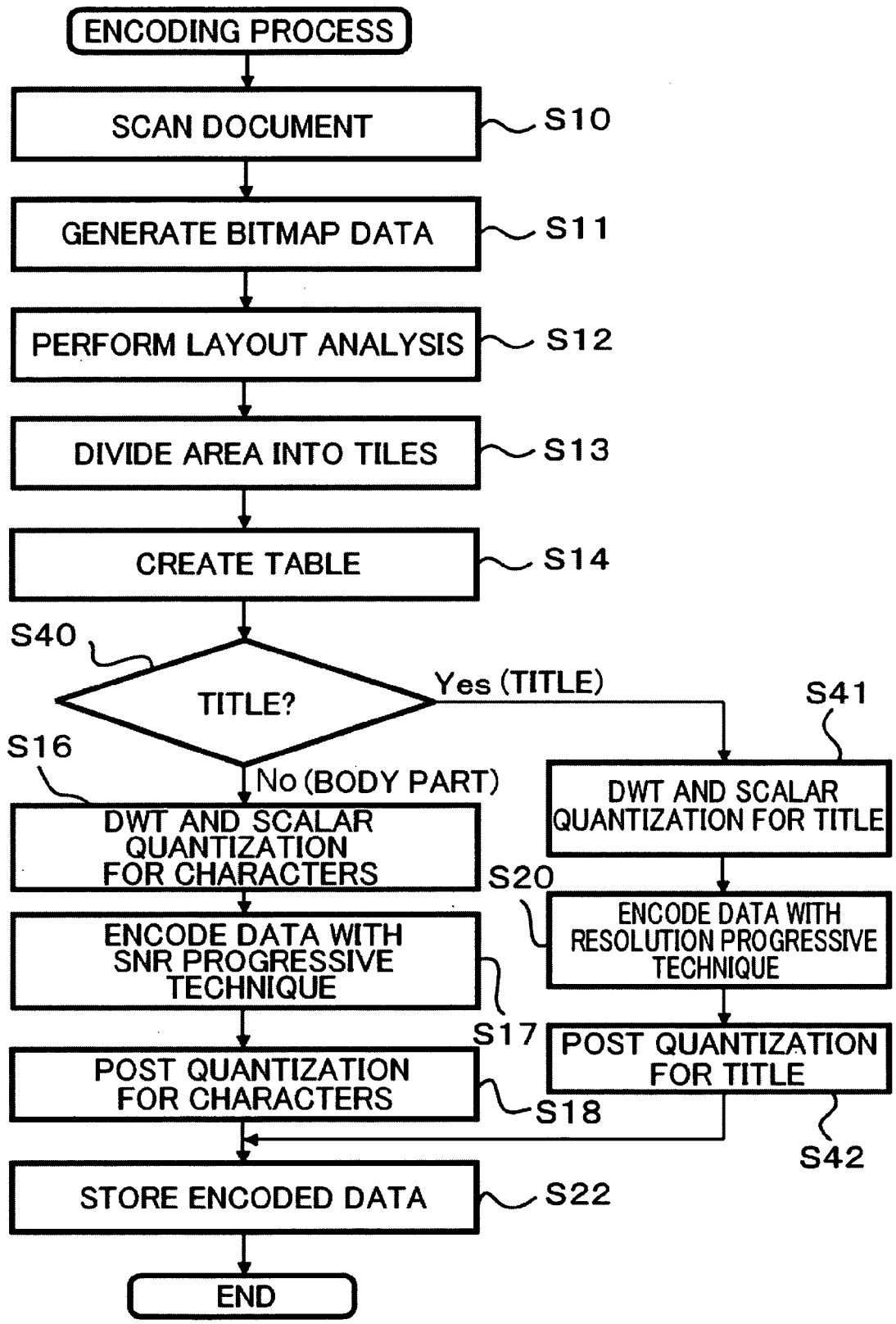
FIG. 8 is a flowchart for explaining an encoding process which is carried out by the image encoder according to the third embodiment of the present invention.

FIG. 8 is a flowchart for explaining an encoding process which is carried out by the image encoder of this embodiment. In the encoding process of FIG. 8, the same (or corresponding) procedures as those of the encoding process in the case of the first embodiment are denoted by the same reference numerals as those shown in FIG. 3.

The scanner 11 scans a target paper document to the digitized (Step S10), and sends image signals obtained by the scanning to the processor 10.

The processor 10 generates bitmap data from the sent image signals (Step S11), and performs layout analysis based on the bitmap data (Step S12). At this time, the processor 10 determines whether each piece of the bitmap data corresponds to the title or body part of the electronic document. As a result of this layout analysis, each piece of the bitmap data is classified into a title area or a body area.

The processor 10 divides each of the title area and the body area into a plurality of tiles (Step S13), and affixes analysis information to each tile (bitmap data included in each tile) (Step S14). Note that this analysis information defines, for example, "0" as the title area and "1" as the body area.

The processor 10 creates a table including the analysis information in association with tile numbers, and stores the created table in the internal memory (temporary storage section 180).

The processor 10 refers one tile from the work memory, and determines whether this tile is in the title area (Step S40). This determination is made every time the processor refers the above-described table.

In the case where it is determined that that the tile is not in the title area (i.e. is in the body area), the processor 10 performs the DWT and scalar quantization for characters, for this tile (Step S16). That is, likewise the first embodiment, the processor 10 transforms data of this tile into a plurality of coefficients, using the DWT, and then performs the scalar quantization for the obtained coefficients using a quantization coefficient for characters. The quantization coefficient for characters is the same as that described in the first embodiment.

The processor 10 encodes the quantized coefficients using the SNR progressive technique (Step S17). Generally, small characters are used in the body part of the document, and thus it is preferred that the SNR progressive technique be used for the characters in the body part.

The processor 10 performs post quantization for the encoded data using a quantization parameter for characters (Step S18). The quantization parameter for character is the same as that described in the first embodiment.

In the above-described step S40, in the case where it is determined that the target tile is included in the title area, the processor 10 performs the DWT for this time, and performs scalar quantization for title (Step S41). Specifically, the processor 10 transforms the data of this tile into a plurality of coefficients through the DWT, and performs scalar quantization for the obtained coefficients using a quantization coefficient for title. In this case, the quantization coefficient for title is such a large value that data compression is performed at a high compression ratio, likewise the first embodiment.

The processor 10 encodes the quantized coefficients using the resolution progressive technique (Step S20). Generally, large characters are used for the title for document, or colored illustrations are used for the title. Hence, it is preferred that the title be formed using the resolution progressive technique.

The processor 10 performs post quantization for the encoded data, using a quantization parameter for title (Step S42). Likewise the first embodiment, the quantization parameter for title is such a small value that data compression is achieved at a high compression ratio, likewise the case of the first embodiment (the quantization parameter for pictures).

The processor 10 stores the encoded data which has been quantized in the above-described steps S18 or S42, in the storage device 12 (Step S22).

The processor 10 carries out the procedures of the above-described steps S40 to S22 for each of the plurality of tiles. Specifically, in the case where it is determined that the target tile is included in the body area, the processor 10 encodes the data of the tile using the SNR progressive technique. On the contrary, in the case where it is determined that the target tile is included in the title area, the processor 10 encodes the data or the tile using the resolution progressive technique. Then, the processor 10 stores thus encoded electronic document in the storage device 12.

After this, the processor 10 decodes the electronic document stored in the storage device 12 and displays the decoded document on the display device 13, in response to a request therefore from the user. In the case, the processor 10 decodes such data using a suitable progressive technique, in accordance with whether each tile is included in the title area or in the body area. Specifically, the processor 10 decodes the data of a target tile using the SNR progressive technique, in the case where it is determined that the tile is included in the body area. On the contrary, the processor 10 decodes the data of a target tile using the resolution progressive technique, in the case where it is determined that the tile is included in the title area.

Hence, in the electronic document to be displayed on the display device 13, the body part of the document can be recognized by the user before data of the tiles included in the body area are completely decoded using the SNR progressive technique, whereas the title can he recognized by the user before data of the tiles included in the title area are completely decoded using the resolution progressive technique.

As explained above, the image encoder according to the third embodiment of the present invention encodes an electronic document using different progressive techniques in the title area and the body area in the document. That is, the image encoder encodes data for the body area using the SNR progressive technique, and encodes data for the title area using the resolution progressive technique.

By this, when decoding the encoded electronic document, the title and body part of the document can be decoded using suitable decoding techniques, respectively. As a result of this, the user can soon recognize the contents of the electronic document including both the title and the body part.

Fourth Embodiment

An image encoder according to the fourth embodiment of the present invention will now be described. The image encoder of this embodiment has the same structure as the structure of the image encoder according to the first embodiment as shown in FIG. 1.

One feature of the image encoder of this embodiment is that a suitable progressive technique is selected based on determination as to whether a target data item is inside or outside the frame within an electronic document. Specifically, the processor 10 performs the layout analysis, based on the determination. After this, he processor 10 selects one of the SNR progressive technique and the resolution progressive technique, for encoding the target data item.

Operations of the image encoder according to the fourth embodiment of the present invention will now be described with reference to FIG. 9.

Figure 9:
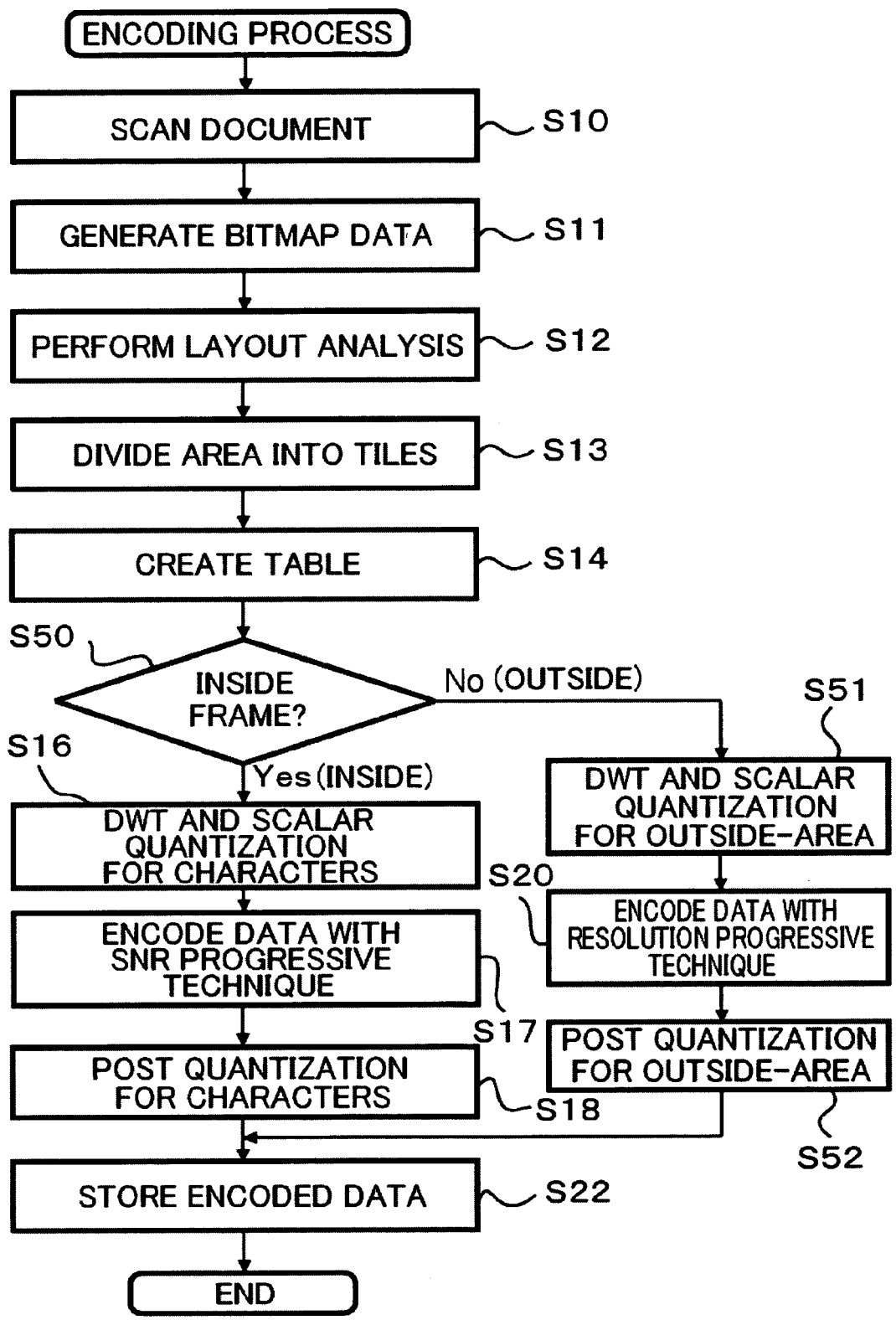
FIG. 9 is a flowchart for explaining an encoding process which is carried out by the image encoder according to the fourth embodiment of the present invention.

FIG. 9 is a flowchart for explaining an encoding process which is carried out by the image encoder of this embodiment. In the encoding process of FIG. 9, the same (or corresponding) procedures as those of the encoding process in the case of the first embodiment are denoted by the same reference, numerals as those shown in FIG. 3.

The scanner 11 scans a target paper document to be digitized (Step S10) so as to obtain image signals, and sends the obtained image signals to the processor 10.

The processor 10 generates bitmap data from the sent image signals (Step S11), and performs layout analysis, based on the bitmap data (Step S12). In this case, specifically, the processor 10 determines whether a target data item is inside or outside the frame which is enclosed by a ruled line, etc. As a result of this layout analysis, pieces of the bitmap data are classified in an inside-area (inside the frame of the document) or an outside-area (outside the frame of the document).

The processor 10 divides each of the inside-area and the outside-area into a plurality of tiles (Step S13), and affixes analysis information to each of the tiles (bitmap data included in each tile) (Step S14). Note that this analysis information expresses that "0" as the inside-area and "1" as the outside-area.

The processor 10 creates a table including this analysis information in association with corresponding tile numbers, and stores the created table in the internal work memory (the temporary storage section 180).

The processor 10 refers to one tile from the work memory, and determines whether this tile is inside the frame (Step S50). This determination is made based on the information included in the above-described table.

In the case where it is determined that the tile is included in the area within the frame, the processor 10 performs the DWT and scalar quantization for characters (Step S16). That is, likewise the case of the first embodiment, the processor 10 transforms data of this time into a plurality of coefficients, and performs scalar quantization for the obtained coefficients using a quantization coefficient for characters. The quantization coefficient for characters is the same as that described in the first embodiment.

The processor 10 encodes the quantized coefficients using the SNR progressive technique (Step S17). For example, just like an account book, in the ease where small characters are written in the frame of the document, it is preferred to encode the data using the SNR progressive technique.

The processor 10 performs post quantization for the obtained encoded data, using a quantization parameter for characters (Step S18). The quantization parameter for characters is the same as that described in the first embodiment.

In the above-described step S50, in the case where it is determined that the tile is not within the frame (i.e. the tile is outside the frame), the processor 10 performs DWT for this time, and performs scalar quantization for the outside-area (Step S51). That is, the processor 10 transforms data within this tile into coefficients, and performs scalar quantization for the obtained coefficients using a quantization coefficient for outside-area. In this case, the quantization coefficient is such a large value that data compression is achieved at a high compression ratio.

The processor 10 encodes the quantized coefficients using the resolution progressive technique (Step S20) to obtain encoded data, and performs post quantization for the obtained encoded data using a quantization parameter for outside-area (Step S52). This quantization parameter is such a small value that data compression can be performed at a low compression ratio.

The processor 10 stores the encoded data which has been quantized in the above-described step S18 or S52, in the storage device 12 (Step S22).

The processor 10 carries out the procedures of the above-described steps S50 to S22 for each of the plurality of tiles. Specifically, the processor 10 encodes data of a target tile using the SNR progressive technique, in the case where it is determined that the tile is within the inside-area. On the contrary, the processor 10 encodes data of a target tile using the resolution progressive technique, in the case where it is determined that the tile is within the outside-area. Then, the processor 10 stores thus encoded electronic document in the storage device 12.

After this, the processor 10 decodes the encoded electronic document stored in the storage device 12 and displays the decoded document on the display device 13, in response to a request therefore from the user. At this time, the processor 10 decodes the document using a corresponding progressive technique, in accordance with whether each tile is inside or outside the frame. That is, in the case where it is determined that a target tile is within the frame, the processor 10 decodes data of the file using the SNR progressive technique. On the contrary, in the case where it is determined that a target file is outside the frame, the processor 10 decodes data of the file using the resolution progressive technique.

Thus, in the electronic document displayed on the display device 13, those data within the frame can be recognized by the user before the data is completely decoded using the SNR progressive technique. On the contrary, those data outside the frame can be recognized by the user before the data is completely decoded using the resolution progressive technique.

As explained above, the image encoder according to the fourth embodiment of the present invention performs encoding of data using different progressive techniques in the inside-area and the outside-areas. That is, the SNR progressive technique is used for encoding data inside the frame, while the resolution progressive technique is used for encoding data outside the frame.

Hence, when decoding the encoded electronic document, suitable decoding techniques can be employed for the data inside the frame and the data outside the frame, respectively. As a result of this, the user can soon recognize the contents of the electronic document including both data of the inside-area and data of the outside-area (information except characters).

In the above-described first to fourth embodiments, the electronic document is encoded in accordance with the human recognition characteristics, so that the electronic document can easily be recognized by the user and can be rapidly displayed. However, the image encoder according to each of the first to fourth embodiments includes a search function for searching a predetermined electronic document from a mass of electronic documents. When generating an electronic document, according to this configuration, the image encoder according to each of the embodiments automatically sets at least one search keyword and affixes this keyword to the electronic document.

For example, the processor 10 performs the layout analysis, while performing the optical character recognition, and extracts at least one keyword from a corresponding electronic document during a predetermined keyword extraction process.

As a result of this keyword extraction process, the processor 10 can automatically affixes the keyword (necessary for searching for a predetermined electronic document) to the electronic document.

In the above-described first to fourth embodiments, image signals are acquired obtained from a paper document by using the scanner 11. However, the method of acquiring the image signals is arbitrary. For example, a digital camera may be used for acquiring image signals.

The encoder of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the encoder of the present invention. The above program and data may be stored in a disk device or the like in the server device on the Internet, and embedded in a carrier wave. The program and data embedded in the carrier wave may be downloaded into the computer so as to realize the encoder of the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-209017 filed on Jul. 10, 2001, and including specification, claims, drawings and summary. The disclosure of the above Japanese Patent Application is incorporated herein by reference in its entirety.

What is claimed is:

1. An image encoder comprising:
   an analyzer which analyzes image data including at least one character area and at least one picture area, and classifies a plurality of unit areas of the image data into a character attribute indicating that the image data is in the at least one character area or a picture attribute indicating that the image data is in the at least one picture area;
   an encoder which encodes the image data, wherein, for each of the plurality of unit areas that are classified by the analyzer, the encoder encodes a unit area of the image data using signal-to-noise ratio (SNR) progression encoding if the unit area of the image data is classified into the character attribute by the analyzer and the encoder encodes the unit area of the image data using resolution progressive encoding if the unit area of the image data is classified into the picture attribute by the analyzer;
   and a storage section which stores the image data that is encoded by said encoder.

2. The image encoder according to claim 1, wherein the SNR progression encoding of image data classified into the character attribute includes a Layer-Resolution-Component-Position (LRCP) progressive procedure and the resolution progressive encoding of the image data classified into the picture attribute includes a Resolution-Layer-Component-Position (RLCP) progressive procedure.

3. The image encoder according to claim 1, wherein the at least one picture area of the image data that is encoded does not include character data.

4. An image encoder comprising:
   analyzing means for analyzing image data including at least one character area and at least one picture area, and classifying a plurality of unit areas of the image data into a character attribute indicating that the image data is in the at least one character area or a picture attribute indicating that the image data is in the at least one picture area;
   encoding means for encoding the image data, wherein, for each of the plurality of unit areas that are classified by the analyzer means, the encoder means encodes a unit area of the image data using signal-to-noise ratio (SNR) progression encoding if the unit area of the image data is classified into the character attribute by the analyzer and the encoder means encodes the unit area of the image data using resolution progressive encoding if the unit area of the image data is classified into the picture attribute by the analyzer means; and
   storage means for storing the image data that is encoded by said encoding means.

5. The image encoder according to claim 4, wherein the SNR progression encoding of image data classified into the character attribute includes a Layer-Resolution-Component-Position (LRCP) progressive procedure and the resolution progressive encoding of the image data classified into the picture attribute includes a Resolution-Layer-Component-Position (RLCP) progressive procedure.

6. The image encoder according to claim 4, wherein the at least one picture area of the image data that is encoded does not include character data.

7. An image encoding method comprising:
   analyzing image data including at least one character area and at least one picture area, and classifying a plurality of unit areas of the image data into a character attribute indicating that the image data is in the at least one character area or a picture attribute indicating that the image data is in the at least one picture area;
   encoding the image data, wherein, for each of the plurality of unit areas that are classified by the analyzer, the encoder encodes a unit area of the image data using signal-to-noise ratio (SNR) progression encoding if the unit area of the image data is classified into the character attribute by the analyzer and the encoder encodes the unit area of the image data using resolution progressive encoding if the unit area of the image data is classified into the picture attribute by the analyzer; and
   storing the image data that is encoded in a predetermined storage section.

8. The image encoding method according to claim 7, wherein the SNR progression encoding of image data classified into the character attribute includes a Layer-Resolution-Component-Position (LRCP) progressive procedure and the resolution progressive encoding of the image data classified into the picture attribute includes a Resolution-Layer-Component-Position (RLCP) progressive procedure.

9. The image encoding method according to claim 7, wherein the at least one picture area of the image data that is encoded does not include character data.

10. A computer readable recording medium which records a program for controlling a computer to execute an image encoding method comprising:

analyzing image data including at least one character area and at least one picture area, and classifying a plurality of unit areas of the image data into a character attribute indicating that the image data is in the at least one character area or a picture attribute indicating that the image data is in the at least one picture area;

encoding the image data, wherein, for each of the plurality of unit areas that are classified by the analyzer, the encoder encodes a unit area of the image data using signal-to-noise ratio (SNR) progression encoding if the unit area of the image data is classified into the character attribute by the analyzer and the encoder encodes the unit area of the image data using resolution progressive encoding if the unit area of the image data is classified into the picture attribute by the analyzer; and storing the image data that is encoded in a predetermined storage section.

11. The computer readable recording medium according to claim 10, wherein the SNR progression encoding of image data classified into the character attribute includes a Layer-Resolution-Component-Position (LRCP) progressive procedure and the resolution progressive encoding of the image data classified into the picture attribute includes a Resolution-Layer-Component-Position (RLCP) progressive procedure.

12. The computer readable recording medium according to claim 10, wherein the at least one picture area of the image data that is encoded does not include character data.

* * * * *